United States Patent [19]

Re et al.

[11] Patent Number: 5,142,426
[45] Date of Patent: Aug. 25, 1992

[54] THIN FILM MAGNETIC HEAD HAVING INTERSPERSED RESISTANCE LAYERS TO PROVIDE A DESIRED CUT-OFF FREQUENCY

[75] Inventors: Mark E. Re, Yorktown; Michael A. Russak, Brewster; Bucknell C. Webb, Croton-on-Hudson, all of N.Y.

[73] Assignee: International Business Machines Corporation, Armonk, N.Y.

[21] Appl. No.: 542,288

[22] Filed: Jun. 21, 1990

[51] Int. Cl.⁵ .............................. G11B 5/147
[52] U.S. Cl. ........................ 360/126; 360/120; 360/110; 360/122
[58] Field of Search .............. 360/110, 119-126

[56] References Cited

U.S. PATENT DOCUMENTS

| 4,241,367 | 12/1980 | Nomura et al. | 360/127 |
| 4,277,808 | 7/1981 | Nagaki | 360/113 |
| 4,306,215 | 12/1981 | Jeffers | 338/32 |
| 4,489,357 | 12/1984 | Von Ooijen et al. | 360/122 |
| 4,651,248 | 3/1987 | Shiiki et al. | 360/119 |
| 4,799,118 | 1/1989 | Yamada et al. | 360/125 |
| 4,814,921 | 3/1989 | Hamakawa et al. | 360/126 |

FOREIGN PATENT DOCUMENTS

| 58-192311 | 11/1983 | Japan | 360/110 |
| 62-257610 | 11/1987 | Japan |  |
| 64-39608 | 2/1989 | Japan |  |

OTHER PUBLICATIONS

J. Appl. Phys., vol. 54, No. 7, pp. 4168-4173, Jul. 83, by Hughes, "Thin Film Recording Head Efficiency and Noise".

J. S. Y. Feng et al., "Permeability of Narrow Permalloy Stripes", Transactions on Magnetics, vol. MAG-13, No. 5, Sep. 1977, pp. 1521-1523.

Mee et al., "Magnetic Recording", McGraw-Hill Book Co., vol. 1, Technology, pp. 314-329.

Lazzari et al., "Integrated Magnetic Recording Heads", IEEE Transactions on Magnetics, vol. MAG-7, No. 1, Mar. 1971, pp. 146-150.

Primary Examiner—Aristotelis Psitos
Assistant Examiner—Alfonso Garcia
Attorney, Agent, or Firm—Perman & Green

[57] ABSTRACT

A thin film magnetic head, having a predetermined cut-off frequency is constructed of alternating first and second layers, the first layers include a magnetic material and the second layers include a resistive material. The resistivity of the second layers is chosen so that the head's cut-off frequency exceeds the head's required frequency response. The resistivity of the second layers is chosen to be considerably less than any level of resistivity which falls within the insulation regime.

3 Claims, 2 Drawing Sheets

THIN FILM MAGNETIC HEAD HAVING INTERSPERSED RESISTANCE LAYERS TO PROVIDE A DESIRED CUT-OFF FREQUENCY

FIELD OF THE INVENTION

This invention relates to thin film magnetic heads, and more particularly, to a multi-layer, thin film magnetic head whose cut-off frequency may be adjusted by altering the resistivity of certain layers in the head.

BACKGROUND OF THE INVENTION

The historical trend in magnetic recording technology has been to continuously increase the density of recorded data. With increases in linear data densities, have come higher linear recording velocities and a requirement for increased frequency response in both read/write heads and their associated electronics. Furthermore, increases in track density have required that the heads exhibit narrower pole tips.

Thin film processing and photolithography have been employed to accurately define magnetic head structure geometries. Until recently, thin film heads have been comprised of a single or multi-turn winding around which, a thin magnetic core of material is disposed. In U.S. Pat. No. 4,651,248 to Shiiki et al., a thin film magnetic head is described which employs a spiral conductor coil disposed between first and second magnetic layers. In U.S. Pat. No. 4,241,367 to Nomura et al., a multi-track thin film magnetic head is described wherein a plurality of individual head structures are formed on a single substrate. In U.S. Pat. No. 4,814,921, to a thin film magnetic head is described which includes a plurality of superposed magnetic films and intermediate layers which may be ferromagnetic, non-magnetic or anti-ferromagnetic.

Other examples of thin film magnetic heads may be found in U.S. Pat. No. 4,799,118 to Yamata et al., U.S. Pat. No. 4,277,808 to Nagaki et al., U.S. Pat. No. 4,306,215 to Jeffers and Japanese Patent 62-257,610.

Modern thin film heads are being applied to higher and higher data rate applications The resulting higher frequencies have increased eddy current losses in such heads. Others, have coped with the eddy current loss problem by proposing that thin film heads be constructed of layers of magnetic material with interspersed insulating films, for instance, see "Integrated Magnetic Recording Heads", Lazzari et al., IEEE Transactions on Magnetics, Vol. Mag-7, No. 1, March, 1971, pp. 146-150; and Japanese Patent 64-39608.

Experience with thin film magnetic heads constructed as suggested by Lazzari et al. has indicated that their structural integrity is not optimum Because the insulating films are deposited on intermediate magnetic films by either sputtering or chemical vapor deposition, the resulting combined layers exhibit built-in stresses which impair the head's structural integrity.

Eddy current effects in magnetic thin film heads are not a significant factor when the required frequency response of the head is 10 MHz or less. At higher frequencies, such losses become significant and radically affect the performance of the head. At such higher frequencies, the permeability of the magnetic thin films are adversely effected. This is demonstrated in "Permeability of Narrow Permalloy Stripes", by Feng et al., Transactions on Magnetics, Volume MAG-13, No. 5, September 1977, pages 1521-1523 where it is shown that above 10 MHz, the permeability of permalloy exhibits a steep fall-off.

Accordingly, it is an object of this invention to provide a thin film magnetic head having improved high frequency response characteristics and good physical integrity.

It is another object of this invention to provide an improved thin film magnetic head wherein the components of the head are chosen to be physically compatible.

SUMMARY OF THE INVENTION

A thin film magnetic head, having a predetermined cut-off frequency is constructed of alternating first and second layers, the first layers comprised of a magnetic material and the second layers comprised of a resistive material. The resistivity of the second layers is chosen so that the head's cut-off frequency exceeds the head's required frequency response. The resistivity of the second layers is chosen to be considerably less than the insulating regime.

DETAILED DESCRIPTION OF THE INVENTION

Figure 1:
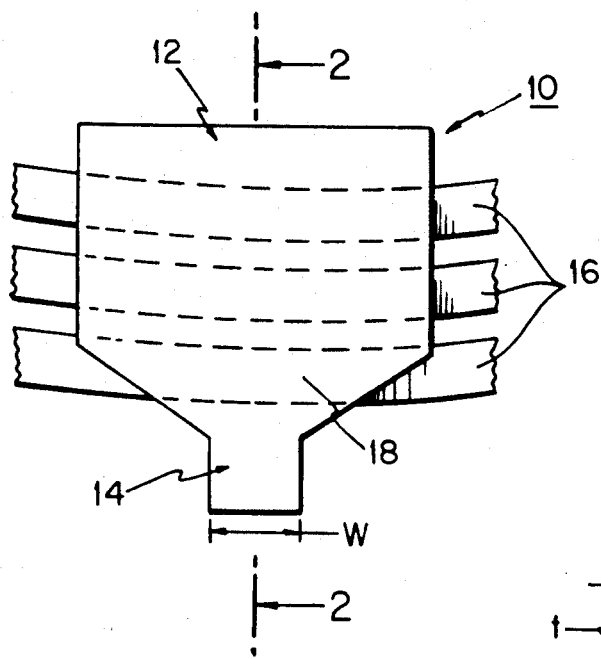
FIG. 1 is a plan view of a thin film magnetic head which incorporates the invention.
Figure 2:
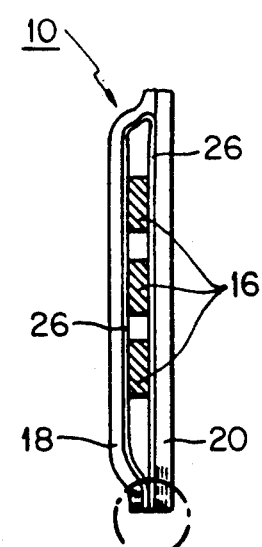
FIGS. 2 and 2A are a sectional views of the thin film magnetic head of FIG. 1, taken along line 2—2.
Figure 2A:
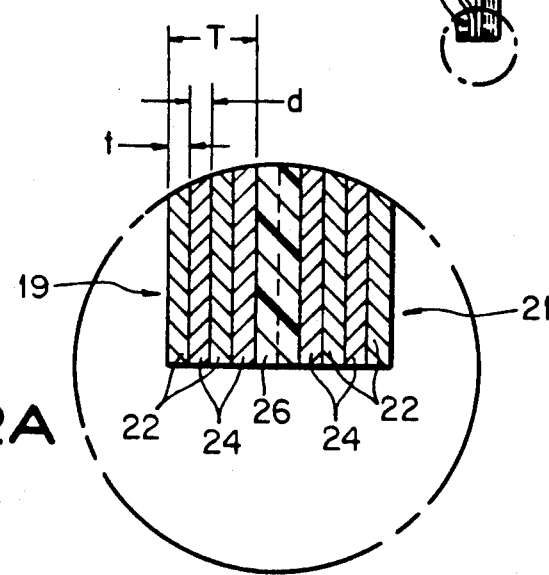

Referring now to FIGS. 1, 2 and 2A, a thin film magnetic head 10 is shown having a pole piece area 12 and a pole tip area 14. A plurality of windings 16 are disposed between pole pieces 18 and 20 in the known manner. As shown in further detail in FIG. 2, pole pieces 18 and 20 and pole tips 19 and 21 comprise a multi-layer structure of interspersed magnetic layers 22 and resistive layers 24. A magnetically insulating layer 26 is positioned between pole tips 19 and 21 and maintains them in separation. As can be seen at the upper right of FIG. 2, insulating layers 26 further isolate windings 16 from pole pieces 18 and 20.

As stated in the introduction to this specification, it is known that eddy currents affect the operation of thin film magnetic heads at high frequencies Multi-layer thin film magnetic heads have been proposed employing insulating layers to reduce eddy current losses. It has, however, been found that the use of insulating layers is not necessary if resistive interlayers are imposed between magnetic layers, with the resistivity of the interlayers exceeding a critical value for the frequency of interest. It has thus been found that eddy currents and their effects can be largely avoided in multi-layer thin film heads by interposing resistive layers between magnetic layers. This finding has greatly widened the available list of materials which are usable as interlayers between the magnetic layers. It further enables the interlayer materials to be closely matched to the magnetic layers to reduce inherent strains therebetween when they are deposited, one on the other. As a result, both deposited, intrinsic stresses and stresses arising from thermal cycling can be greatly reduced, thereby providing an improved thin film magnetic head.

Figure 3:
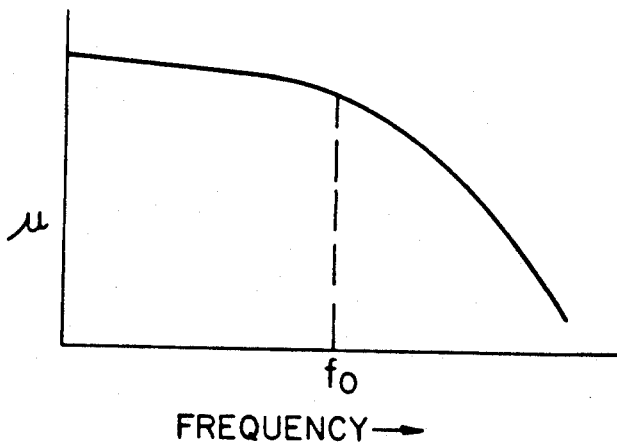
FIG. 3 is a plot of magnetic permeability versus frequency of a magnetic material suitable for use with the invention.

In FIG. 3, a plot is shown of permeability versus frequency for magnetic materials (e.g., permalloy) suitable for use in thin film heads. It is known that the permeability of a magnetic material sees a significant decrease after a specific frequency ($f_o$) is reached. That frequency is called the "cut-off" frequency. The cut-off frequency for any particular magnetic material is directly related to the level of eddy currents in the material and, more particularly, to the effective resistance across a head structure including such material.

For a single layer of permalloy or other magnetic material, the cut-off frequency $f_0$ is proportional to the resistivity ($r_m$) of the magnetic material and is inversely proportional to the thickness (T) of the material. The specific relationship and is as follows:

$$f_o = \frac{c^2 r_m}{4\pi^2 \mu T^2} \qquad 1.$$

where:
c = the speed of light
$\mu$ = the permeability of the magnetic material.

The relationship of equation 1 can be extended to a multilayer structure, as shown in FIG. 2, wherein t is the thickness of each magnetic layer 22; d is the thickness of each resistive layer 24; W is the width of pole tip 14; and T is the thickness of a single pole tip (e.g., 19). It can be seen that the ratio R of resistivities between a laminated pole tip, (e.g., FIG. 2), to a non-laminated pole tip is as follows:

$$R = \frac{t + d \frac{r_i}{r_m}}{t + d} \qquad 2.$$

where:
$r_i$ is the resistivity resistivity layers 24,
$r_m$ is the resistivity of magnetic layers 22.

It can be shown that when resistive coupling layers exist between the magnetic layers, a laminated structure of width W and thickness N(t+d), behaves exactly like an unlaminated rectangular slab of magnetic material of width W/R$^{\frac{1}{2}}$ and thickness T=Nt. N is the number of layers, t is the thickness of each magnetic layer and d is the thickness of each resistive layer.

There are two cases where eddy currents can be avoided in an isotropic slab: when its thickness is less than the skin depth or its width is less than its skin depth. As is known, skin depth is directly related to frequency of excitation. The cut-off frequency $f_r$ of a laminated magnetic structure can be expressed as follows:

$$f_r = f_o R \left( \frac{T}{W} \right)^2 \qquad 3.$$

From equation 3, it can be seen that if $f_r > f_o$, the eddy current properties of a laminated structure will be dominated by $f_r$. By adjusting the value of R, the cut-off frequency $f_r$ can be adjusted so as to exceed the expected frequencies to be encountered by the magnetic head. The full expression for the cut-off frequency $f_r$ is given in equation 4 below:

$$f_r = f_o R \left[ \frac{T}{W} \right]^2 = \frac{c^2 r_m}{4\pi^2 \mu W^2} \left[ \frac{t + d \frac{r_i}{r_m}}{t + d} \right] \qquad 4.$$

Table 1 below provides an indication of minimum resistivities, in Ohm-cm, to obtain a given cut-off frequency $f_r$ in a permalloy film having a width W. Table 1 was calculated using equation 4 and solving it for $r_i$. It was assumed in the calculation of Table 1, that the magnetic layer thickness were three times those of the interspersed resistivity layer thickness.

TABLE 1

| | | CUT-OFF FREQUENCY VS. RESISTIVITY $f_r$ (MHz) | | | | | | |
|---|---|---|---|---|---|---|---|---|
| | | 10 | 20 | 30 | 40 | 50 | 100 | 300 | 1000 |
| W | 3 | .0003 | .00066 | .0010 | .0014 | .0017 | .0035 | .011 | .036 |
| (microns) | 6 | .0014 | .0028 | .0010 | .0057 | .0071 | .0143 | .043 | .144 |
| | 10 | .0039 | .0079 | .012 | .016 | .020 | .04 | .12 | .4 |
| | 30 | .036 | .072 | .11 | .14 | .18 | .36 | 1.08 | 3.6 |
| | 100 | .40 | .80 | 1.2 | 1.6 | 2.0 | 4.0 | 12.0 | 40. |

As can be seen from Table 1, the calculated resistivities needed to provide a desired cut-off frequency lie within the metallic and semi-conductor regions. As a result, a wide variety of materials may be employed to provide interspersed resistive layers 24 between magnetic layers 22 in magnetic head 10.

Silicon may be employed as a resistive layer, and its resistivity varied by alteration of its dopant concentration. Silicon can be plated as well as deposited by other techniques (e.g., sputtering, chemical vapor deposition etc.). Germanium and carbon are also appropriate and their resistivities may be varied by alteration of the deposition conditions. Bismuth, manganese, and gadolinium are also usable, with alloying being used to increase their respective resistances. Various oxides are also suitable. For instance, indium tin oxide, tin oxide and lead oxide may have their resistivities varied by alterations of their oxygen content. Various nitrides are appropriate, including boron nitride, niobium nitride, vanadium nitride, tungsten nitride, chromium-aluminum nitride, iron-nitride, etc. Various silicides are also usable and encompass those including chromium, tantalum, tungsten, titanium, etc. Furthermore, organics which exhibit the desieed levels of resistivity. Metals and other alloys are also acceptable for such use.

EXPERIMENTAL

The effects above described are supported by mean field calculations of the permeability of magnetic thin-film laminates. The theory has been confirmed by experimental results for the special case where the dielectric layers are insulating and the dielectric layer conductivity is dominated by the dielectric layer capacitance.

Multilayer films of 1000 A permalloy layers, separated by 100A insulating $ZrO_2$ layers, have been made by ion-beam sputtering. Oriented films were obtained with coercivities below 1 Oe and $H_k = 4-5$ Oe, by sputtering in an applied in-plane magnetic field. The frequency dependent permeabilities of these films were measured between 100 kHz and 200 MHz using a transmission line permeameter. The transmission line technique applies a uniform low-amplitude (<50 mOe) sinusoidal magnetic field perpendicular to the easy axis. The permeability was determined from the induced dipole moment detected by a pair of counterwound pick-up loops. A thin permalloy reference film of known permeability was used for calibration.

Figure 4:
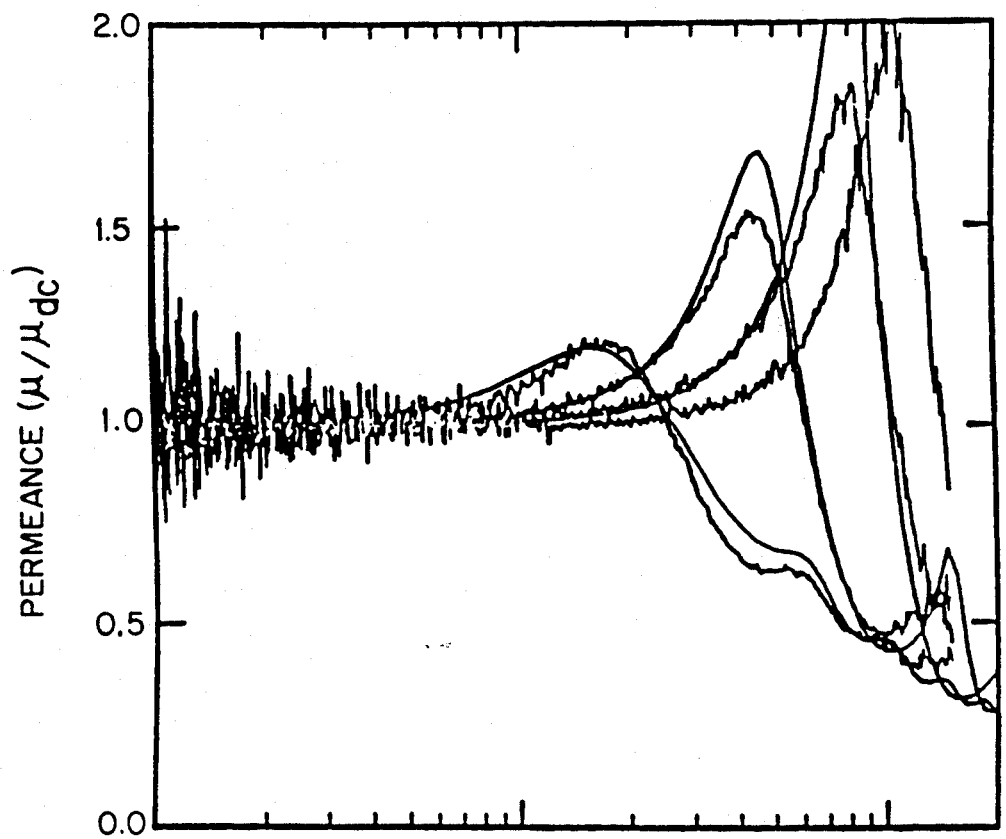
FIG. 4 shows plots of permeance vs. frequency, both calculated and experimental, for various permalloy/ZrO$_2$ films.
Figure 5:
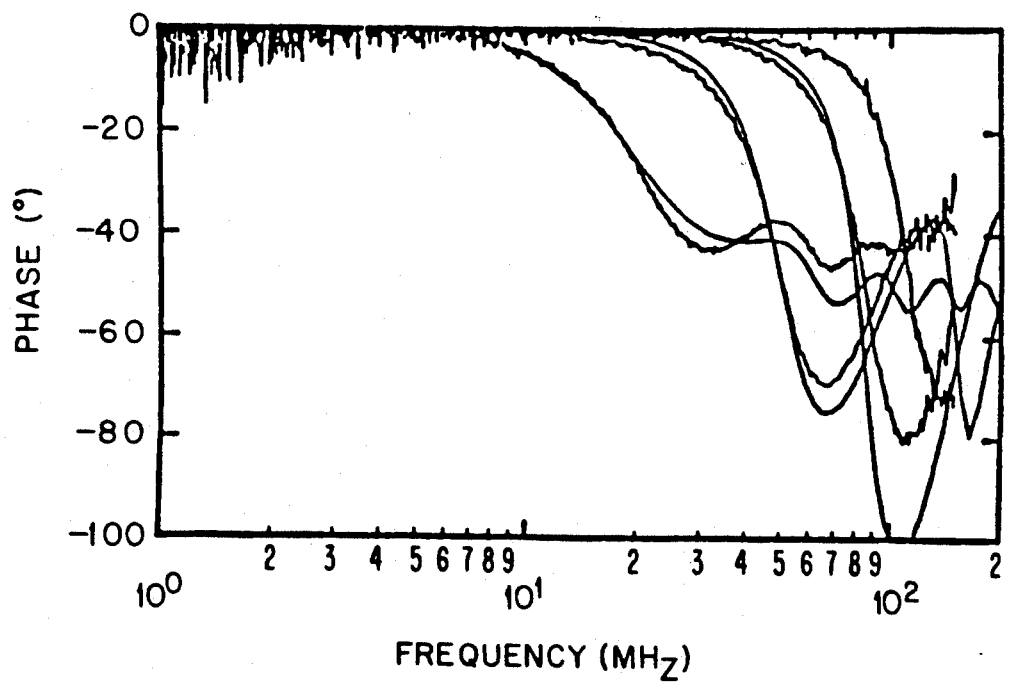
FIG. 5 shows plots of permenance versus frequency, both calculated and experimental, for various permalloy/ZrO$_2$ films.

Data for a $NiFe/ZrO_2$ multilayer film of 3 micron total magnetic thickness, cut into 1.2 cm, 0.5 cm and 0.3 cm widths is shown in FIGS. 4 and 5, along with calculated curves (smooth curves).

The permeability of as-deposited films, and films cut or diced into strips of uniform width, was affected by electrical shorting occurring at the film edges. To eliminate this shorting, the surface of each film was protected with wax and the film edges acid polished on a cloth wetted with aqua regia. This treatment preferentially removed permalloy and left the exposed insulating $ZrO_2$ layer.

Resonance data after the final etching step for a NiFe/$ZrO_2$ multilayer film of 3 um total magnetic thickness, cut into 1.2 cm, 0.5 cm and 0.3 cm widths agreed well with the theory. In the widest film, three resonances were observable at frequencies where the film width was 1, 3, and 5 half-wavelengths. The resonances shifted to proportionately higher frequencies as the film was narrowed As expected from the calculations, the resonance amplitudes changed as approximately the square root of the resonance frequency.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A multilayer thin film magnetic read/write head exhibiting reduced eddy current losses and having a predetermined cut-off frequency, comprising:

plurality of alternating first and second layers, said first layers comprised of an electrically conductive magnetic material, each of said second layers comprised of an electrically conductive resistive material exhibiting a resistivity in the range of approximately 0.0003 to 40 ohm-cm, the resistivity of each of said second layers enabling said cut-off frequency to provide a required frequency response.

2. The thin film head as recited in claim 1 wherein said head is provided with a pole tip of width W, said resistivity of each said second layer being inversely proportional to said width W squared.

3. The thin film head as recited in claim 1 wherein the resistivity of each said second layer is determined from the equation:

$$f_r = f_o R \left[ \frac{T}{W} \right]^2 = \frac{c^2 r_m}{4\pi^2 \mu W^2} \left[ \frac{t + d \frac{r_i}{r_m}}{t + d} \right]$$

where:
$r_m$ is the resistivity of the magnetic layer;
$r_i$ is the resistivity of the resistive layer;
t is the thickness of each magnetic layer;
d is the thickness of each resistivity layer;
$\mu$ is the permeability of the magnetic material;
$f_r$ is the cut-off frequency of the layered magnetic head;
$f_0$ is the cut-off frequency of the magnetic material with no laminations
c is the speed of light
W is the width of a pole tip of the magnetic head.

* * * * *